United States Patent
Parikh

(10) Patent No.: US 9,758,137 B1
(45) Date of Patent: Sep. 12, 2017

(54) METHODS AND SYSTEMS FOR BRAKING A VEHICLE UTILIZING AN ELECTRONIC PARKING BRAKE TO AVOID A COLLISION

(71) Applicant: Robert Bosch GmbH, Stuttgart (DE)

(72) Inventor: Sameer J. Parikh, Novi, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/187,911

(22) Filed: Jun. 21, 2016

(51) Int. Cl.
| | |
|---|---|
| *B60T 7/12* | (2006.01) |
| *B60W 10/18* | (2012.01) |
| *B60W 30/08* | (2012.01) |
| *B60W 30/09* | (2012.01) |
| *B60T 7/22* | (2006.01) |

(52) U.S. Cl.
CPC ........................ *B60T 7/22* (2013.01)

(58) Field of Classification Search
CPC combination set(s) only.
See application file for complete search history.

(56) References Cited

U.S. PATENT DOCUMENTS

| 6,084,508 | A | 7/2000 | Mai et al. | |
|---|---|---|---|---|
| 8,366,211 | B2 | 2/2013 | Suzuki | |
| 8,880,305 | B2 | 11/2014 | Inoue et al. | |
| 9,142,132 | B2 | 9/2015 | Yao et al. | |
| 9,150,200 | B2 * | 10/2015 | Urhahne | B60W 50/16 |
| 9,156,446 | B2 | 10/2015 | Bonne | |
| 2004/0140710 | A1 | 7/2004 | Alvarez et al. | |
| 2006/0225971 | A1 | 10/2006 | Jaeger | |
| 2009/0099746 | A1 | 4/2009 | Hilberer | |
| 2014/0067221 | A1 * | 3/2014 | Sundaram | B60T 7/042 701/70 |
| 2014/0365062 | A1 * | 12/2014 | Urhahne | B60W 50/16 701/23 |
| 2017/0113667 | A1 * | 4/2017 | Kim | B60T 7/22 |

* cited by examiner

*Primary Examiner* — Yonel Beaulieu
(74) *Attorney, Agent, or Firm* — Michael Best & Friedrich LLP

(57) ABSTRACT

Methods and systems of braking a vehicle. One method includes determining, with a first electronic processor, whether the vehicle is in a collision state or a non-collision state. The method also includes determining, with the first electronic processor, an amount of deceleration needed to avoid a collision with a first object. The method also includes determining, with a second electronic processor, whether an electronic parking brake has been activated. Responsive to determining that the electronic parking brake is activated and the vehicle is in the collision state, the method also includes controlling, with the second electronic processor, the electronic parking brake to provide an amount of deceleration of the vehicle based on the amount of deceleration needed to avoid a collision with a first object and a predetermined maximum amount of deceleration of the electronic parking brake.

14 Claims, 5 Drawing Sheets

METHODS AND SYSTEMS FOR BRAKING A VEHICLE UTILIZING AN ELECTRONIC PARKING BRAKE TO AVOID A COLLISION

FIELD

Embodiments relate to methods and systems for braking a vehicle utilizing an electronic parking brake.

BACKGROUND

Commonly, parking brakes are mechanically controlled. More recently, the electronic parking brake (EPB) has been introduced. Electronic parking brakes may be configured in two modes: static and dynamic. The static mode covers the traditional use case of applying a parking brake to hold the vehicle in a standstill (for example, when parking on a hill). The dynamic mode involves actuating the parking brake while the vehicle is in motion. Beyond electronic parking brakes, there are different driver assistance systems (for example, automatic emergency braking (AEB) systems) that use sensors to prevent a collision of the vehicle. AEB systems determine the existence of an impending collision and control vehicle steering and/or braking maneuvers to avoid or decrease the impact of an impending collision.

SUMMARY

In emergency or escalated driving situations, if the driver activates the EPB, braking is usually controlled by the electronic stability control (ESC) module of the vehicle. Once the ESC module is activated via the EPB, the ESC module executes a predefined deceleration profile of the vehicle. However, in some escalated driving situations, the predefined deceleration profile of the vehicle does not provide enough deceleration to avoid the impact of the impending collision.

Some embodiments provide methods and systems where the ESC module may execute more deceleration than the predefined deceleration profile of the EPB maneuvers when the AEB system requests the ECS module to do so. Certain embodiments provide methods and systems where an ESC module may arbitrate controlled deceleration between the maximum deceleration of the EPB's predefined deceleration and that of the AEB system.

One embodiment provides a method for braking a vehicle. The method includes determining, with a first electronic processor, whether the vehicle is in a collision state or a non-collision state. The method also includes determining, with the first electronic processor, an amount of deceleration needed to avoid a collision with a first object. The method also includes determining, with a second electronic processor, whether an electronic parking brake has been activated. Responsive to determining that the electronic parking brake is activated and the vehicle is in the collision state, the method also includes controlling, with the second electronic processor, the electronic parking brake to provide an amount of deceleration of the vehicle based on the amount of deceleration needed to avoid a collision with a first object and a predetermined maximum amount of deceleration of the electronic parking brake.

Another embodiment provides a system for braking a vehicle. The system includes a collision avoidance controller communicatively coupled to a proximity sensor and configured to determine whether the vehicle is in a collision state or a non-collision state. The collision avoidance controller also configured to determine an amount of deceleration needed to avoid a collision with a first object. The system also includes brake system controller communicatively coupled to the collision avoidance controller and configured to determine whether an electronic parking brake has been activated. Responsive to when the electronic parking brake is activated and when the vehicle is in a collision state, the brake system controller is also configured to control the electronic parking brake to provide an amount of deceleration of the vehicle based on the amount of deceleration needed to avoid a collision with a first object and a predetermined maximum amount of deceleration of the electronic parking brake.

Other aspects and embodiments of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

It should also be noted that a plurality of hardware and software based devices, as well as a plurality of different structural components may be used to implement the invention. In addition, embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more processors. As such, it should be noted that a plurality of hardware and software based devices, as well as a plurality of different structural components may be utilized to implement the invention.

Figure 1:
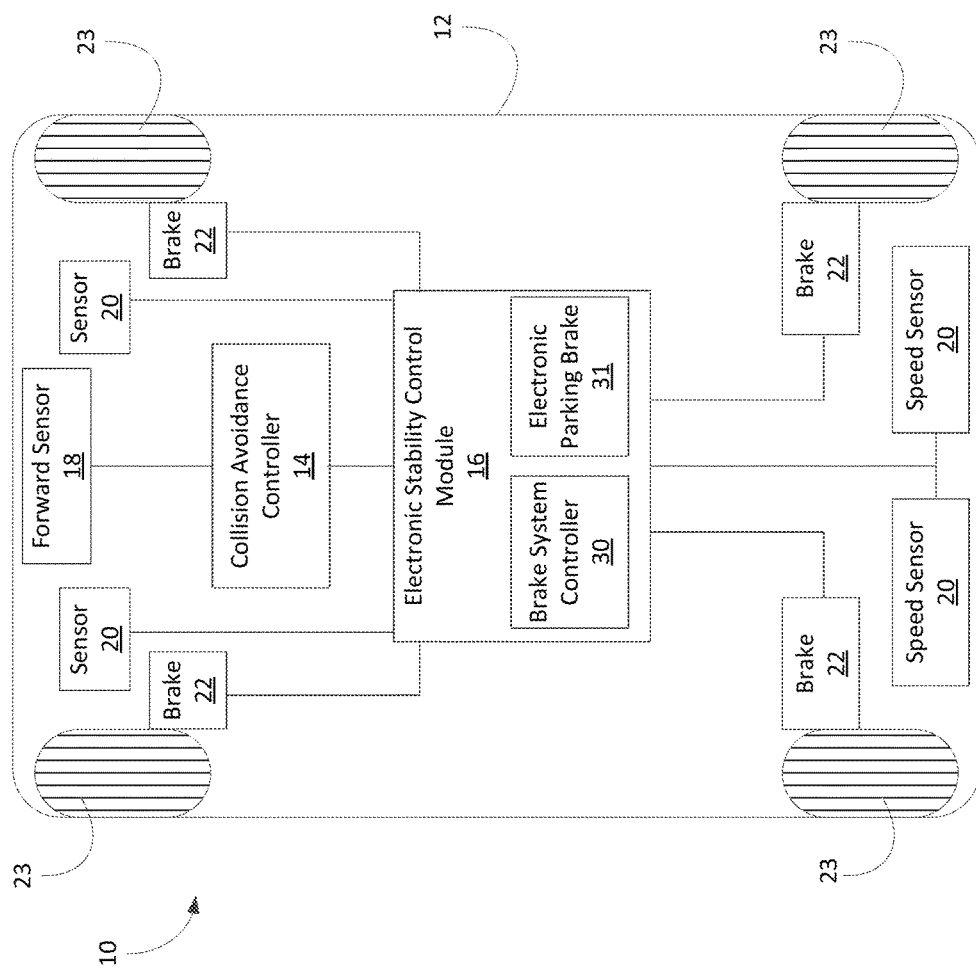
FIG. 1 schematically illustrates a system for braking a vehicle.
Figure 2:
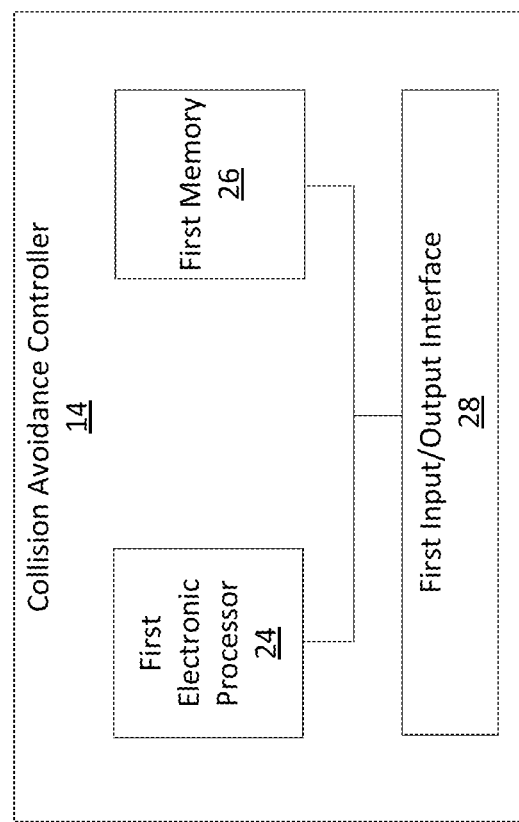
FIG. 2 schematically illustrates a collision avoidance controller of the system of FIG. 1.

FIG. 1 illustrates a system 10 for braking a vehicle 12. In the example illustrated in FIG. 1, the system 10 includes a collision avoidance controller 14, and an electronic stability control ("ESC") module 16. All or portions of the collision avoidance controller 14 and the electronic stability control module 16 may be implemented using known control devices and/or software. In some embodiments the collision avoidance controller 14 is included within the ESC module 16.

The system 10 also includes one or more sensors for determining a distance between the vehicle and objects surrounding the vehicle. In the example provided, system 10 includes a forward sensor 18 that senses the distance between the vehicle and objects in front of the vehicle 10. The forward sensor 18 may be implemented using one or more ultrasonic sensors, radar sensors, laser range finders, or other sensors capable of sensing proximity. Although the forward sensor 18 is included in the illustrated example, a rear-facing sensor or one or more sensor positioned at other locations of the vehicle 12 may be used. The system 10 also includes a plurality of vehicle sensors 20. The plurality of vehicle sensors 20 includes sensors for sensing a variety of conditions of the vehicle 12. For example, the plurality of sensors 20 may sense wheel speed, acceleration, brake pressure, steering angle or vehicle trajectory, and the other vehicle conditions. The plurality of sensors 20 may be positioned at different and/or additional locations throughout the vehicle 12 and are not limited to the positions illustrated in FIG. 1.

The system 10 includes a plurality of brakes 22. In the embodiment illustrated, each of the brakes 22 is associated with one wheel 23 of the vehicle 12. In some embodiments, the brakes 22 are hydraulic brakes 22. The system 10 may include fewer or additional forward sensors 18, brakes 22, additional or other components. In some embodiments, the collision avoidance controller 14 is included in the ESC module 16.

The components in system 10 may be communicatively connected to each other using various wired connections. In some cases, all or some of the components are connected to controller area network (CAN) bus or similar communication bus. In some instances, wireless connections implemented using near field communication (NFC) or other similar protocols may be used.

The collision avoidance controller 14 includes a first electronic processor 24 (for example, a microprocessor or other suitable device), a first memory 26, and a first input/output interface 28. The first electronic processor 24, the first memory 26, and the first input/output interface 28 communicate over one or more control or data connections or buses. The first electronic processor 24 is configured to retrieve, from the first memory 26, instructions related to the control processes and methods described herein. The first electronic processor 24 is also configured to execute the instructions stored in first memory 26.

First memory 26 is an example of a non-transitory computer readable medium and may include, for example, a program storage area and a data storage area (for example, for storing the distance data). The program storage area and the data storage area may include combinations of different types of memory, such as read-only memory ("ROM") and random access memory ("RAM"). The software may include firmware, one or more applications, program data, filters, rules, one or more program modules, and other executable instructions. For example, the software may include instructions for and associated data for braking a vehicle.

The first input/output interface 28 provides a communication link between the collision avoidance controller 14 (and its components) and various input and output devices. For example, the collision avoidance controller 14 communicates with the forward sensor 18 through the first input/output interface 28. In one embodiment, the collision avoidance controller 14 communicates with the plurality of sensors 20 and/or the ESC module 16 through the first input/output interface 28.

In one embodiment, the collision avoidance controller 14 and, more particularly, the first electronic processor 24, executes instructions stored in the first memory 26 to perform collision avoidance analysis for a vehicle according to the methods described herein. As described in more detail below, the collision avoidance controller 14 may execute instructions to determine an impending collision to an object that is no longer avoidable, and perform vehicle braking to avoid or decrease the impact of an impending collision.

Figure 3:
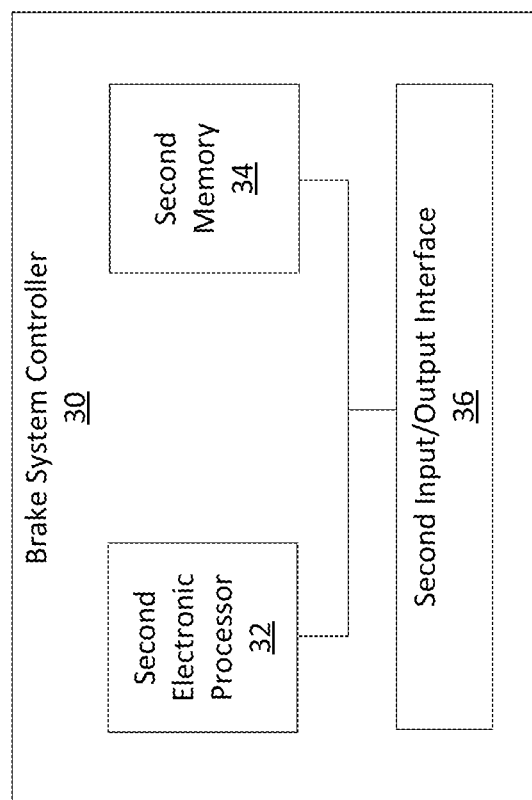
FIG. 3 schematically illustrates a brake system controller of the system of FIG. 1.

In the example illustrated in FIG. 1, the ESC module 16 includes a brake system controller 30 and an electronic parking brake 31. As can be seen by reference to FIG. 3, the brake system controller 30 includes a second electronic processor 32 (for example, a microprocessor or other suitable device), a second memory 34, and a second input/output interface 36. The second electronic processor 32, the second memory 34, and the second input/output interface 36 communicate over one or more control or data connections or buses. The basic operations and numerous variations of the second electronic processor 32, the second memory 34, and the second input/output interface 36 are similar to those described with respect to other electronic processors, memory, and input/output interfaces described herein. Thus, further details of these aspects are not provided other than to note, as should be apparent, that in certain embodiments, the second electronic processor 32 executes computer-readable instructions ("software") stored, for example, in the second memory 34.

The brake system controller 30 and, more particularly, the second electronic processor 32, executes instructions stored in the second memory 34 to perform vehicle braking. In some embodiments, the brake system controller 30 performs a parking brake function or acts as an electronic parking brake by actuating one or more of the brakes 22 of the vehicle 12. The brake system controller 30 may actuate the one or more brakes 22 symmetrically (for example, uniformly actuate a set of the brakes 22) or asymmetrically (for example, actuate one of the brakes more than another brake). In some embodiments, when the electronic parking brake 31 is activated, the brake system controller 30 actuates one or more of the brakes 22 according to a predetermined braking profile.

Figure 4:
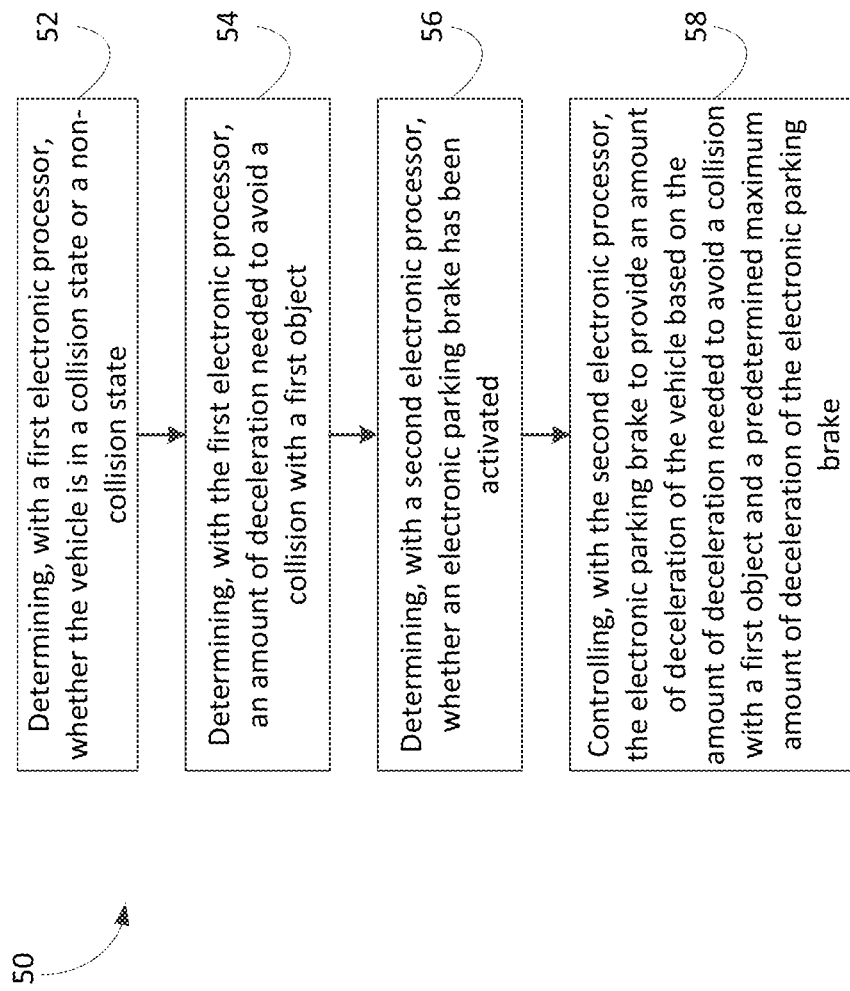
FIG. 4 is a flowchart illustrating a method for braking a vehicle using the system of FIG. 1.

FIG. 4 illustrates one method 50 for braking a vehicle. The method 50 includes determining, with the first electronic processor 24 of the collision avoidance controller 14, whether the vehicle 12 is in a collision state or a non-collision state (at block 52). The collision avoidance controller 14 may use the distance data from the forward sensor 18 and well as vehicle speed data, for example, from one of the sensors 20 to determine the likelihood of a collision. The vehicle 12 is considered to be in a collision state when the avoidance controller 14 determines that a collision between the vehicle 12 and an object (for example, a first object) is likely to occur. The vehicle 12 is considered to be in a non-collision state when the avoidance controller 14 determines that a collision between the vehicle 12 and the first object is unlikely to occur.

The method 50 also includes determining, with the first electronic processor 24 of the collision avoidance controller 14, an amount of deceleration needed to avoid a collision with the first object (at block 54). The collision avoidance controller 14 uses distance data from forward sensor 18, speed data collected from one or more of the sensors 20, the current trajectory of the vehicle, or a combination thereof to make this determination.

In block 56 of method 50, the second electronic processor 32 of the brake system controller 30 determines whether the electronic parking brake 31 has been activated. This determination may be made based on, for example, whether an activation input has been received via the second input/ output interface 36. The activation input may be received, for example, when a driver of the vehicle 12 presses an electronic parking brake button in the passenger compartment of the vehicle 12. The brake system controller 30 may also determine that the electronic parking brake 31 has been activated based on vehicle data collected by the plurality of sensors 20, for example, whether the speed of the vehicle 12 is decreasing at a significant rate.

If the electronic parking brake 31 is activated, the brake system controller 30 actuates braking of the vehicle 12 in accordance with a braking profile (for example, a predetermined maximum amount of deceleration) of the electronic parking brake 31.

In response to determining that the electronic parking brake 31 of the vehicle 12 is activated and that the vehicle 12 is in a collision state, the second electronic processor 32 controls the electronic parking brake 31 to provide an additional amount of deceleration of the vehicle 12 (at block 58). The second electronic processor 32 controls the amount of deceleration of the vehicle 12 provided by the electronic parking brake 31 based on the amount of deceleration needed to avoid the impending collision with an object and the predetermined maximum amount of deceleration of the electronic parking brake 31.

In other words, the brake system controller 30 arbitrates the predetermined maximum amount of deceleration provided by the electronic parking brake 31 with the amount of deceleration needed to avoid the impending collision with the first object. In some embodiments, the amount of deceleration of the vehicle 12 provided by the electronic parking brake 31 is an ideal braking amount needed to avoid an impending collision determined by the first electronic processor 24.

Figure 5:
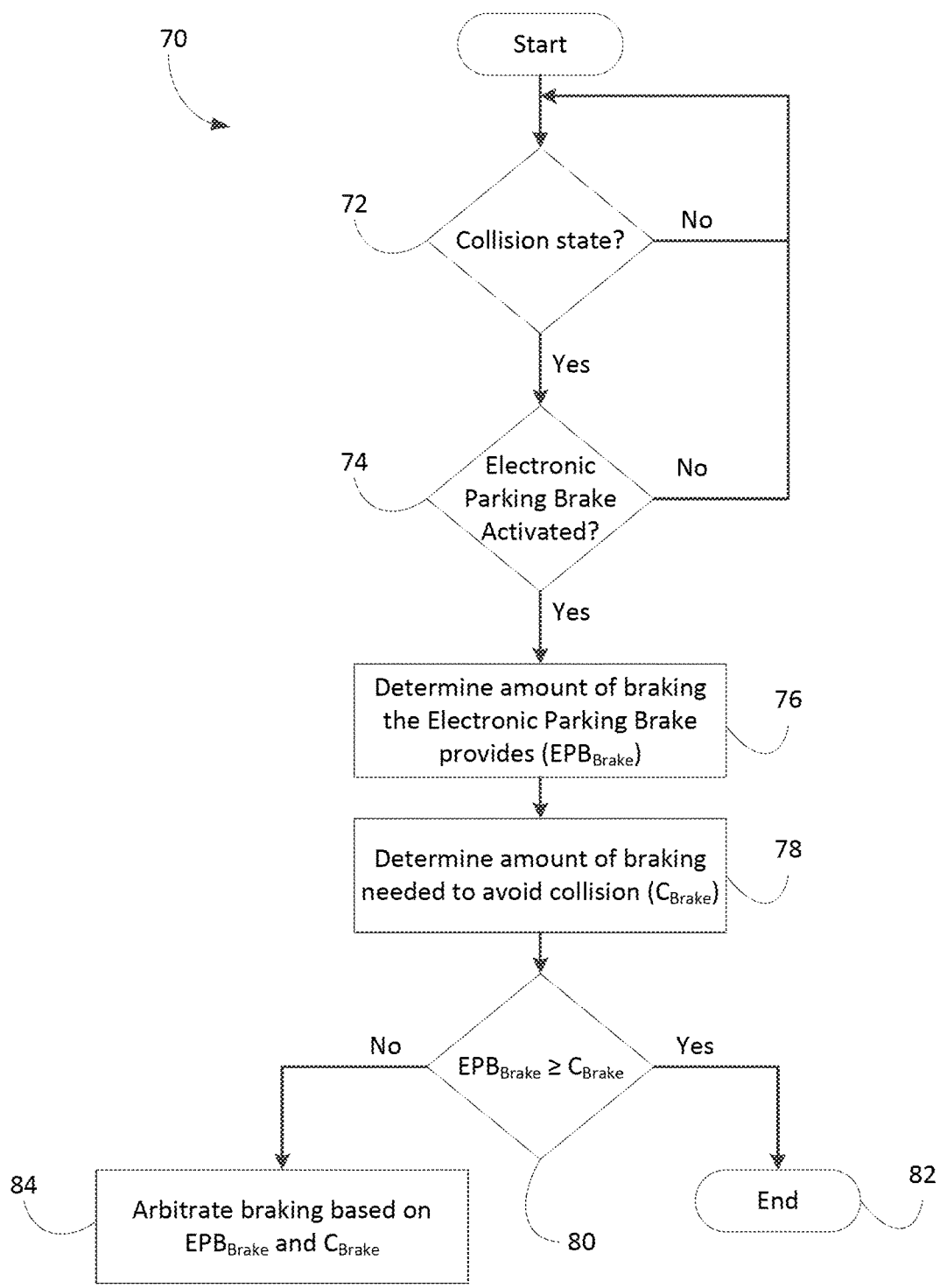
FIG. 5 is a flowchart illustrating a method of controlling the braking of a vehicle according to some embodiments.

FIG. 5 illustrates a method 70 of controlling the braking of a vehicle. The method 70 is provided as one example and the steps provided may be performed in an alternative order or simultaneously. The method 70 includes determining whether the vehicle 12 is in a collision state (at block 72). If the vehicle 12 is not in a collision state (for example, a collision is unlikely), the method 70 returns to determining whether the vehicle 12 is in a collision state (at block 72). If the vehicle 12 is in a collision state (for example, a collision is likely), the method 70 determines whether the electronic parking brake 31 of the vehicle 12 is activated (at block 74). If the electronic parking brake 31 of the vehicle 12 is not activated, the method 70 returns to determining whether the vehicle 12 is in a collision state (at block 72). If the electronic parking brake 31 of the vehicle 12 is activated, the method 70 determines an amount of braking the electronic parking brake 31 provides ($EPB_{Brake}$) (at block 76). The method 70 also includes determining an amount of braking needed to avoid the collision ($C_{Brake}$) (at block 78). Once the method 70 determines $EPB_{Brake}$ and $C_{Brake}$, the method 70 determines whether the $EPB_{Brake}$ is greater than or equal to the $C_{Brake}$ (at block 80). When $EPB_{Brake}$ is greater than or equal to the $C_{Brake}$, $EPB_{Brake}$ provides enough braking to the vehicle 12 to avoid the impending collision (for example, there is no need for more braking to avoid the impending collision). Therefore, when $EPB_{Brake}$ is greater than or equal to $C_{Brake}$, method 70 ends (at block 82). When the $EPB_{Brake}$ is not greater than or equal to the $C_{Brake}$, the $EPB_{Brake}$ does not provide enough braking to the vehicle 12 to avoid the impending collision. The method 70 arbitrates the braking amount that the electronic parking brake 31 of the vehicle provides (at block 84).

In an escalated driving situation (for example, when the vehicle 12 is in a collision state), the driver of the vehicle 12 may activate the electronic parking brake 31 of the vehicle 12. When the driver activates the electronic parking brake 31, the electronic parking brake 31 will only provide a predetermined maximum amount ($EPB_{Brake}$) of braking according to the predefined braking profile of the electronic parking brake 31. If the collision avoidance controller 14 determines that the amount of braking needed to avoid an impending collision ($C_{Brake}$) is greater than maximum amount available within the predefined braking profile ($EPB_{Brake}$) of the electronic parking, the collision avoidance controller 14 sends a request to the brake system controller 30 to provide additional braking (via the electronic parking brake 31 or the plurality of brakes 22). If the amount of braking needed to avoid an impending collision is less than the maximum amount available within the predefined braking profile, then the collision avoidance controller 14 does nothing to modify the operation of the electronic parking brake 31 and maintains the operation of the electronic brake within the predefined braking profile. In this sense, the brake system controller 30 may control or arbitrates the electronic parking brake 31 to provide an additional deceleration according to whether the vehicle is in a collision state or non-collision state.

Thus, the invention provides, among other things, methods and systems for braking a vehicle. Various features and advantages of the invention are set forth in the following claims.

What is claimed is:

1. A method for braking a vehicle, the method comprising:
   determining, with a first electronic processor, whether the vehicle is in a collision state or a non-collision state;
   determining, with the first electronic processor, an amount of deceleration needed to avoid a collision with a first object;
   determining, with a second electronic processor, whether an electronic parking brake has been activated; and
   responsive to determining that the electronic parking brake is activated and the vehicle is in the collision state,
      controlling, with the second electronic processor, the electronic parking brake to provide an amount of deceleration of the vehicle based on the amount of deceleration needed to avoid a collision with a first object and a predetermined maximum amount of deceleration of the electronic parking brake.

2. The method of claim 1, wherein controlling the electronic parking brake includes
   evaluating the predetermined maximum amount of deceleration of the electronic parking brake and the amount of deceleration needed to avoid the collision with the first object, and
   actuating the electronic parking brake to provide the amount of deceleration of the vehicle, wherein the amount of deceleration of the vehicle is based on the evaluation of the predetermined maximum amount of deceleration of the electronic parking brake and the amount of deceleration needed to avoid the collision with the first object.

3. The method of claim 1, wherein controlling the electronic parking brake includes arbitrating an amount of deceleration provided by the electronic parking brake and an amount of deceleration to be provided by an automatic emergency braking system based on the predetermined maximum amount of deceleration of the electronic parking brake.

4. The method of claim 1, wherein determining whether the vehicle is in a collision state or a non-collision state includes receiving distance data from a forward sensor and evaluating the distance data.

5. The method of claim 1, further comprising:
responsive to determining that the vehicle is in a collision state,
automatically actuating the electronic parking brake of the vehicle.

6. A system for braking a vehicle, the system comprising:
a collision avoidance controller communicatively coupled to a proximity sensor and configured to
determine whether the vehicle is in a collision state or a non-collision state;
determine an amount of deceleration needed to avoid a collision with a first object; and
a brake system controller communicatively coupled to the collision avoidance controller and configured to
determine whether an electronic parking brake has been activated, and
responsive to when the electronic parking brake is activated and when the vehicle is in the collision state,
control the electronic parking brake to provide an amount of deceleration of the vehicle based on the amount of deceleration needed to avoid a collision with a first object and a predetermined maximum amount of deceleration of the electronic parking brake.

7. The system of claim 6, wherein the brake controller is further configured to
evaluate the predetermined maximum amount of deceleration of the electronic parking brake and the amount of deceleration needed to avoid the collision with the first object, and
actuate the electronic parking brake to provide the amount of deceleration of the vehicle, wherein the amount of deceleration of the vehicle is based on the evaluation of the predetermined maximum amount of deceleration of the electronic parking brake and the amount of deceleration needed to avoid the collision with the first object.

8. The system of claim 6, wherein the brake controller is further configured to arbitrate an amount of deceleration provided by the electronic parking brake and an amount of deceleration to be provided by an automatic emergency braking system based on the predetermined maximum amount of deceleration of the electronic parking brake.

9. The system of claim 8, wherein the brake controller is further configured to receive distance data from a proximity sensor and to evaluate the distance data.

10. The system of claim 9, wherein the amount of deceleration needed to avoid a collision with a first object is based on the received distance data.

11. The system of claim 6, wherein the instructions executed by the second electronic processor further includes an instruction to automatically actuate the electronic parking brake of the vehicle when the vehicle is in a collision state.

12. The system of claim 6, wherein the first object includes at least one selected from the group consisting of a second vehicle, a building, a tree, and a pedestrian.

13. The system of claim 6, wherein the proximity sensor is selected from the group consisting of a laser range finder sensor, a radar sensor, and an ultrasonic sensor.

14. The system of claim 6, wherein the amount of deceleration needed to avoid a collision with the first object is an ideal amount of deceleration needed to avoid the collision with the first object.

* * * * *